(12) United States Patent
Dion et al.

(10) Patent No.: US 11,306,955 B2
(45) Date of Patent: Apr. 19, 2022

(54) METHOD OF MONITORING A SHUTDOWN CYCLE OF AN AIR CYCLE MACHINE OF AN AIRCRAFT

(71) Applicant: Simmonds Precision Products, Inc., Vergennes, VT (US)

(72) Inventors: Bernard Dion, Monkton, VT (US); Brian R. Shea, Windsor, CT (US); Peter Zywiak, Avon, CT (US); Jeffrey J. Nieter, Coventry, CT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 159 days.

(21) Appl. No.: 16/401,914

(22) Filed: May 2, 2019

(65) Prior Publication Data

US 2020/0348060 A1 Nov. 5, 2020

(51) Int. Cl.
*G01M 13/04* (2019.01)
*F25B 49/02* (2006.01)
*F25B 9/00* (2006.01)
*B64D 13/02* (2006.01)

(52) U.S. Cl.
CPC ............. *F25B 49/02* (2013.01); *B64D 13/02* (2013.01); *F25B 9/004* (2013.01); *G01M 13/04* (2013.01); *F05D 2260/80* (2013.01); *F25B 2500/27* (2013.01)

(58) Field of Classification Search
CPC .................................................. G01M 13/04
See application file for complete search history.

(56) References Cited

U.S. PATENT DOCUMENTS

| | | | | |
|---|---|---|---|---|
| 4,709,785 A | * | 12/1987 | Csanady, Jr. | ........... F01D 25/20 184/6.4 |
| 4,730,484 A | * | 3/1988 | Olschefski | ............. G01H 1/003 73/114.81 |
| 4,825,826 A | * | 5/1989 | Andres | ..................... F01M 5/00 123/196 S |
| 6,711,952 B2 | | 3/2004 | Leamy et al. | |
| 9,976,933 B2 | | 5/2018 | Army et al. | |
| 10,047,726 B2 | | 8/2018 | Sakaguchi | |
| 2002/0085925 A1 | * | 7/2002 | Zamalis | ................ F04D 29/063 417/228 |
| 2003/0066352 A1 | * | 4/2003 | Leamy | ..................... G01H 1/08 73/593 |
| 2012/0107094 A1 | * | 5/2012 | Lillis | ..................... F04D 27/001 415/118 |
| 2012/0210694 A1 | | 8/2012 | Holmquist | |
| 2013/0067911 A1 | | 3/2013 | Worden et al. | |
| 2013/0096848 A1 | | 4/2013 | Hatch et al. | |

(Continued)

FOREIGN PATENT DOCUMENTS

EP 3266709 A1 1/2018
WO 2012164387 A1 12/2012

OTHER PUBLICATIONS

Extended European search report issued in corresponding EP application No. 19214600.9, dated Sep. 9, 2020.

*Primary Examiner* — Eric S. McCall
(74) *Attorney, Agent, or Firm* — Locke Lord LLP; Scott D. Wofsy; Gabrielle L. Gelozin

(57) ABSTRACT

A method of monitoring an air cycle machine including driving a rotary shaft of an air cycle machine, disconnecting a driving source to allow the rotary shaft to slow the rotary shaft, and monitoring a shutdown cycle of the rotary shaft.

13 Claims, 2 Drawing Sheets

(56) References Cited

U.S. PATENT DOCUMENTS

2016/0341116 A1* 11/2016 French .................... F01D 25/16
2018/0010981 A1* 1/2018 Army .................... F16C 17/102
2018/0051745 A1* 2/2018 Himmelmann ....... F01D 25/162
2021/0072116 A1* 3/2021 Carini ................. G01M 13/045

* cited by examiner

METHOD OF MONITORING A SHUTDOWN CYCLE OF AN AIR CYCLE MACHINE OF AN AIRCRAFT

BACKGROUND

Technological Field

The present disclosure relates to a method of monitoring an air cycle machine, and more particularly to a method of monitoring the degradation of performance of an air cycle machine.

Description of Related Art

For some applications, the rotating components within an Air Cycle Machine (ACM) are supported by a type of bearing known as an air bearing. An air bearing uses cushions of air to support, in the thrust and radial directions, a shaft upon which is mounted turbines and compressors. As an air bearing degrades, the integrity of its air cushion decreases. The air bearing degradation may progress to the point where the ACM shaft rotational speeds cannot be maintained to provide air conditioning functionality. Ultimately, the bearing integrity ceases and the shaft seizes, rendering the ACM inoperable. As the bearing degrades, it may cause costly secondary damage to the ACM shaft, turbines, compressors, and housing.

The current means of detecting ACM air bearing degradation does not provide enough information to proactively plan for ACM bearing failure. Maintenance is reactively scheduled after significant air bearing damage has progressed to the point that the ACM's ability to condition air temperatures suffers, or the ACM shaft seizes rendering the unit inoperable. There remains a need in the art for methods and system that are economically viable, save repair time, and allow proactively scheduling ACM maintenance before the ACM air bearings are damaged and costly secondary damage to the shaft, turbines, compressors, or ACM housing occurs. The present disclosure may provide a solution for at least one of these remaining challenges.

SUMMARY OF THE INVENTION

A method of monitoring an air cycle machine includes driving a rotary shaft of an air cycle machine using airflow from an air source as a driving potential, disconnecting the air source to stop the driving potential to allow the rotary shaft to decelerate to a stop, and monitoring a deceleration cycle of the rotary shaft. The monitoring can include monitoring time required for the rotary shaft to decelerate to a stop from an operational speed during a ramp down period of air cycle machine operation. At least one sensor can be operatively connected to the rotary shaft to monitor the deceleration or shutdown cycle of the rotary shaft. Monitoring requires between 30 seconds and 60 seconds and a sampling rate of 1 to 2 samples per second.

Monitoring can include communicating deceleration data to a controller and performing a corrective action in response to deceleration times exceeding a predetermined threshold. The corrective action can include sending an alert to a flight crew of an aircraft on which the air cycle machine is included and/or removal of the air cycle machine.

Monitoring can include extrapolating deceleration data using multiple monitoring deceleration or shutdown cycles to estimate when deceleration time will reach the predetermined threshold. A corrective action can be taken before the deceleration time will reach the predetermined threshold. Corrective action can include sending an alert to a flight crew of an aircraft on which the air cycle machine is included and/or removal of the air cycle machine. The monitoring and extrapolating can include multiple deceleration or shutdown cycles and monitoring changes between deceleration or shutdown cycles. Extrapolating can include at least two ramp down cycle times.

A monitoring system for an air cycle machine as part of an environmental control system of an aircraft is also disclosed. The monitoring system includes a housing, a rotary shaft operatively coupled to a compressor and a turbine, the rotary shaft disposed within the housing, rotary shaft being disposed between a plurality of bearings, and at least one sensor mounted to the housing and oriented to monitor rotational deceleration of the rotary shaft, and a controller in operative communication with the at least one sensor to determine if the deceleration of the rotary shaft exceeds a predetermined limit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
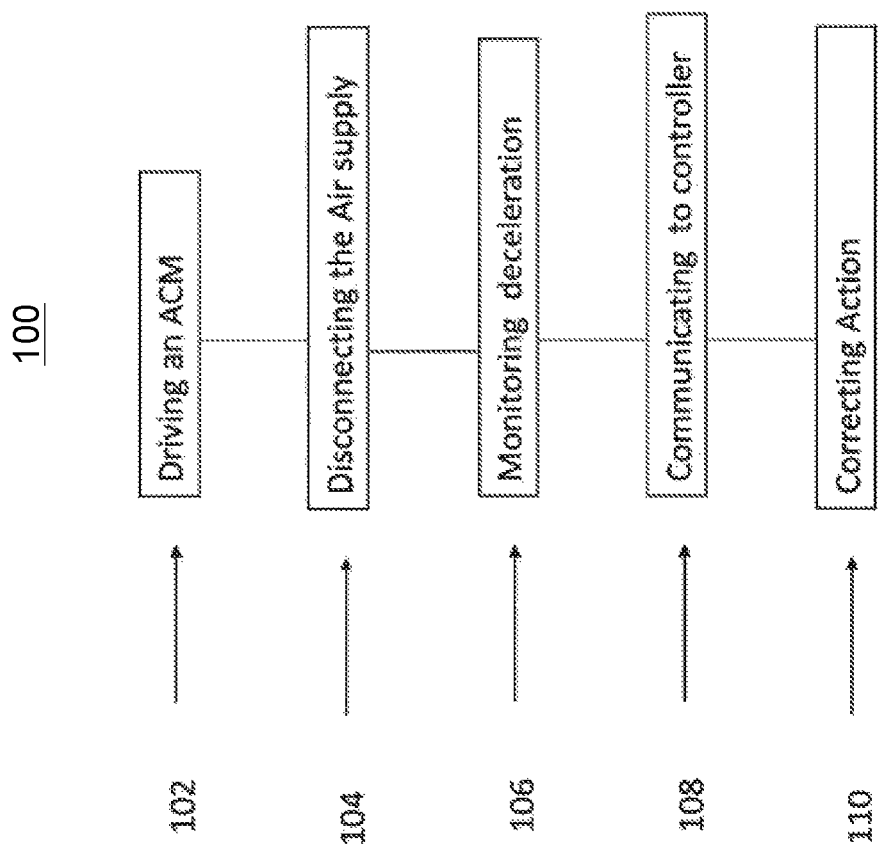
FIG. 1 is a perspective view of a method of monitoring an ACM.

Reference will now be made to the drawings wherein like reference numerals identify similar structural features or aspects of the subject invention. For purposes of explanation and illustration, and not limitation, a partial view of an exemplary embodiment of an air cycle monitoring system and method in accordance with the invention is shown in FIG. 1 and is designated generally by reference character 100. Other embodiments of the system in accordance with the invention, or aspects thereof, are provided in FIG. 2, as will be described. The methods and systems of the invention can be used to monitor air cycle machine performance and take corrective action before performance degrades to the point where the machine has to be scrapped.

Rotating components within an ACM may consist of multiple turbines and compressors mounted to a rotary shaft. The rotary shaft is driven by airflow from a high pressure source that produces a flow rate and pressure sufficient to drive the rotary components. The air passing through the ACM is cooled or heated to desired temperatures by passing it through heat exchangers, turbines, or compressors. The rotating components within the ACM are supported by air bearings and are subject to progressive degradation and seizure when damaged. As shown in FIG. 1, a method 100 include a function that monitors an ACM and not only detects the presence of air bearing degradation, but also provides a means of trending the degradation. The method 100 of monitoring an air cycle machine (ACM) includes driving 102 a rotary shaft of an air cycle machine using airflow from an air source as a driving potential. Rotating components, such as the rotary shaft, in ACMs are typically supported by air bearings which requires high pressure air flow. Disconnecting 104 the air source to stop the driving potential allows the rotary shaft to decelerate to a stop. This cycle can also include normal operation of the ACM and not limited to active drive-disconnect for the purpose of making this degradation assessment. Complete deceleration from an operating rotational velocity usually takes place in under a minute. At least one sensor can be operatively connected to the rotary shaft to monitor the deceleration or shutdown cycle of the rotary shaft. Monitoring 106 requires between 15 seconds and 60 seconds per cycle and a sampling rate of 1 to 2 samples per second.

Monitoring 106 can also include communicating 108 deceleration data to a controller and then performing a corrective action 110 in response to deceleration times exceeding a predetermined threshold. The threshold indicates an extremely fast deceleration rate. If deceleration of the rotary shaft is takes less time than the predetermined threshold, it is an indicator of ACM degradation past a certain operative. The corrective action 110 can include sending an alert to a flight crew of an aircraft on which the air cycle machine is included and/or removal of the air cycle machine or servicing of the bearing or shaft of the ACM on wing. Monitoring 106 can also include extrapolating deceleration data using multiple monitoring deceleration or shutdown cycles to estimate when deceleration time will reach the predetermined threshold. A controller can record deceleration times from multiple flights and ACM cycles. The controller extrapolates a trendline to be used a projection of when an ACM is likely to reach a predetermined deceleration threshold. A trendline can be calculated using least squares regression for a best fit. Monitoring can also measure when the airflow has stopped by measuring the deceleration and insuring it went to zero or through an RPM range that is known a priori to reflect the condition where the airflow has been removed.

A corrective action 110 can be taken before the actual deceleration time will reach the predetermined threshold. Corrective action can include sending an alert to a flight crew of an aircraft on which the air cycle machine is included and/or removal of the air cycle machine or servicing of the bearing or shaft of the ACM on wing.

The monitoring 106 and extrapolating can include multiple deceleration or shutdown cycles over time. The controller can also monitor changes between proximate deceleration or shutdown cycles and be programmed to alert if an extreme change in deceleration times occurs from one cycle to the next.

Figure 2:
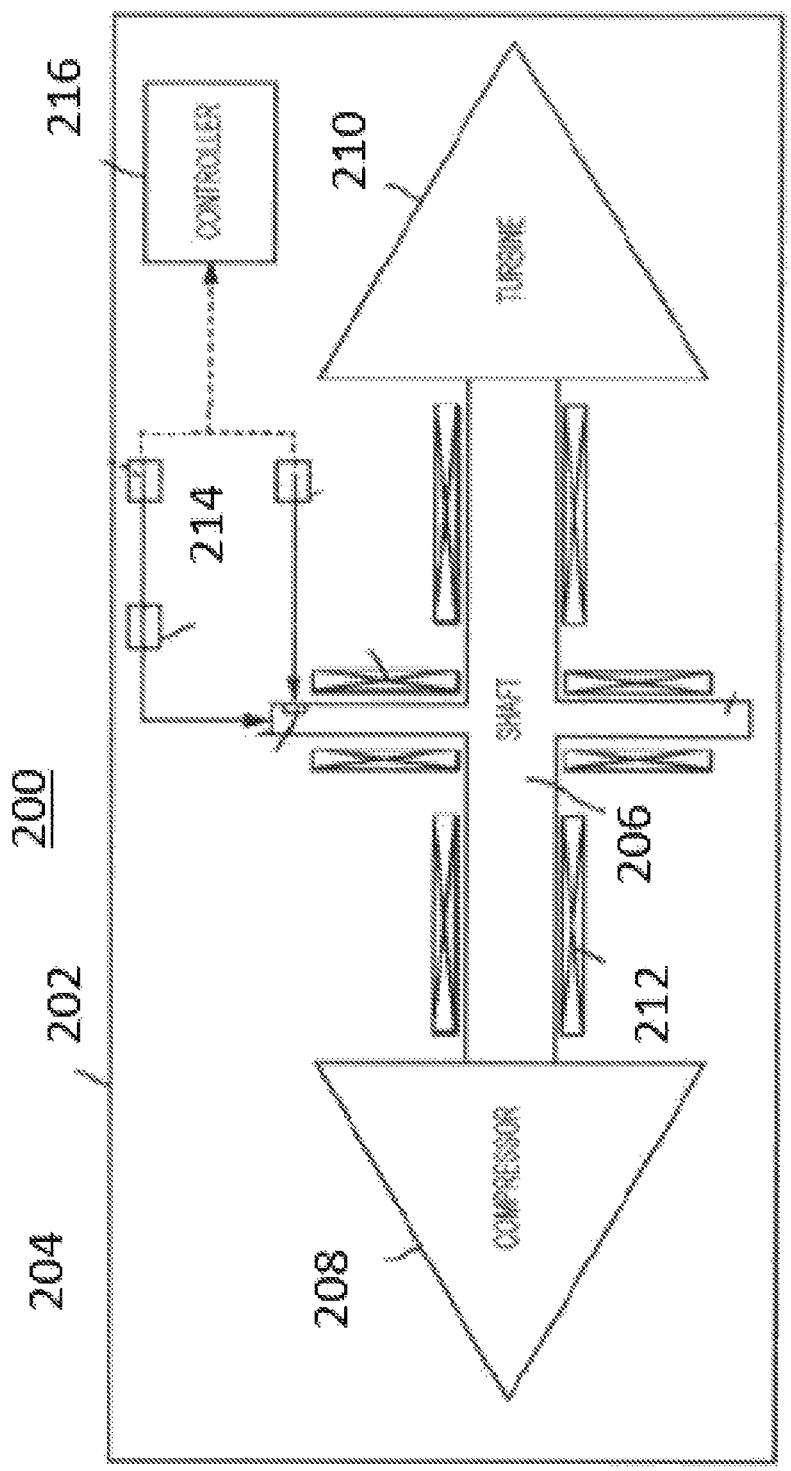
FIG. 2 is a schematic of an air cycle machine having a monitoring system.

Referring to FIG. 2, a monitoring system 200 for an air cycle machine 202 as part of an environmental control system of an aircraft is also disclosed. The monitoring system 200 includes a housing 204, a rotary shaft 206 operatively coupled to a compressor 208 and a turbine 210, the rotary shaft 206 being disposed within the housing 204. The rotary shaft 206 is disposed between a plurality of bearings 212, and at least one sensor 214 mounted to the housing The sensor 214, a tachometer, can also be mounted to another non-rotating frame of reference and oriented to monitor rotational deceleration of the rotary shaft. A controller 216 is in operative communication with the at least one sensor 214 to determine if the deceleration of the rotary shaft 206 exceeds or breaches a predetermined limit or threshold.

The methods and systems of the present disclosure, as described above and shown in the drawings, provide for methods and system that are economically viable, save repair time, and allow proactively scheduling ACM maintenance before ACM air bearings are damaged and costly secondary damage to the shaft, turbines, compressors, or ACM housing occurs. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of monitoring an air cycle machine of an aircraft comprising:
   driving a rotary shaft of an air cycle machine;
   disconnecting a driving source to allow the rotary shaft to slow the rotary shaft;
   extrapolating a shutdown cycle data and estimating when a shutdown cycle time will breach a predetermined threshold; and
   monitoring a shutdown cycle of the rotary shaft.

2. The method of claim 1, wherein the monitoring further includes monitoring time required for the rotary shaft to slow to a selected rotational velocity from an operational rotational velocity.

3. The method of claim 1, further comprising communicating monitored data to a controller and performing an action in response to shutdown cycle times breaching a selected threshold.

4. The method of claim 1, wherein monitoring takes place during a ramp down period of air cycle machine operation.

5. The method of claim 1, wherein the monitoring step lasts at least 30 seconds.

6. The method of claim 5, wherein the monitoring step includes a sampling rate of between 1 and 2 samples per second.

7. The method of claim 1, wherein at least one sensor operatively connected to the rotary shaft monitors the shutdown cycle of the rotary shaft.

8. The method of claim 7, further comprising monitoring at least two ramp down cycle times.

9. The method of claim 7, further comprising monitoring multiple shutdown cycles.

10. The method of claim 9, further comprising monitoring changes between shutdown cycles.

11. The method of claim 7, further comprising performing an action with respect to the air cycle machine prior to a shutdown cycle time reaching the predetermined threshold.

12. The method of claim 11, wherein the action includes sending an alert to a flight crew or maintenance crew of an aircraft on which the air cycle machine is included.

13. The method of claim 11, wherein the action includes removal of the air cycle machine from operation.

* * * * *